Aug. 29, 1967 L. HITCH 3,339,062
GYROSCOPIC NAVIGATION INSTRUMENT
Filed Nov. 15, 1965 7 Sheets-Sheet 1

INVENTOR.
LEWIS HITCH

Fig. 4A

INVENTOR.
LEWIS HITCH

Aug. 29, 1967     L. HITCH     3,339,062
GYROSCOPIC NAVIGATION INSTRUMENT
Filed Nov. 15, 1965     7 Sheets-Sheet 6

INVENTOR.
LEWIS HITCH

United States Patent Office 3,339,062
Patented Aug. 29, 1967

3,339,062
GYROSCOPIC NAVIGATION INSTRUMENT
Lewis Hitch, 795 Janos Lane,
West Hempstead, N.Y. 11552
Filed Nov. 15, 1965, Ser. No. 507,913
11 Claims. (Cl. 235—150.25)

This invention relates to a gyroscopic navigation instrument and is a continuation-in-part of my co-pending application No. 62,238 filed Oct. 12, 1960.

The object of the invention is the provision of a navigational device which automatically determines geographical positions, distance from one geographical position to another, and the geographical relationship between such positions, including direction from one to the other. The invention is applicable to moving vehicles of many kinds such as surface ships, aircraft, land vehicles, guided missiles and the like. However, for purposes of illustration and not limitation, the invention will more particularly be described herein in connection with surface ships.

More specifically, the present device is adapted to compute the latitude and longitude of any geographical position on the earth's surface, this being the equivalent of a "fix" as determined by conventional navigational methods and practices. For example, said device is adapted to determine the geographical position of a ship at any stage of its voyage from any port of embarkation to any port of debarkation or destination. The computation occurs automatically and continuously, the readings changing progressively with the movement of the ship. A continuous recording may be made of these readings by conventional means in order to provide a continuous log of the voyage.

The navigational device herein claimed also provides an automatic computation of the distance between any predetermined point of destination and any given point in the course which a ship may take from its port of embarkation to said point of destination. The distance which is thus computed relates to the great circle course between the geographical point occupied by the ship at the moment of computation and the point of destination. Such great circle course may vary from time to time depending upon the course the ship takes but the computation is continuous and a reading may be taken at any time to ascertain the great circle distance from the ship's position at that moment to its destination. Here too a continuous record may be provided by conventional means in order to supplement the log recording above mentioned. The two records may be provided in parallel columns for example, one column giving the progressively changing geographical positions and the other providing a great circle distance reading for each such geographical position.

The navigational device herein claimed also determines direction. By this is meant the direction in which a ship must travel in order to proceed from one geographical point to another along a great circle route. This direction is continuously variable by reason of many factors such as wind, tide and the general surface condition of the sea. Other factors may enter the situation, for example, the necessity of avoiding land masses and thereby traveling courses other than great circle routes. Here, too, is a continual computation which at all times gives the great circle route for a ship at any point along its course to its point of destination. Once again it is possible to provide a continuous record of the directional readings of the apparatus, such record to be supplementary to the readings above mentioned. It is further possible to provide automatic steering of the ship to correspond to the directional computations of the apparatus. In short, not only would the apparatus provide directional readings, but it would automatically translate those readings into control of the steering apparatus of the ship in order to direct the ship in accordance with such directional computations.

In the operation of a navigational device of the character herein described and claimed, the following procedures occur:

The navigational device herein described and claimed is fed, at the start of a given trip or voyage, with certain information and certain settings are made. For example, information regarding the distance which separates the points of embarkation and debarkation is fed to the apparatus. This distance is taken along a great circle route. Data concerning the latitude and longitude of said points of embarkation and debarkation are fed to the apparatus and this of course would include the direction in which the ship would be required to proceed in order to travel a great circle route from said point of embarkation to said point of debarkation.

As the ship proceeds in its course toward the point of destination, the distance reading will continuously change and it will become smaller and smaller in direct proportion to the progress made by the ship toward its destination. Each reading at any point along the ship's course would be a great circle reading from that point to the point of destination. The reading does not indicate the distance covered by the ship from its point of embarkation to any point in its course; it indicates only the great circle distance which separates the ship at any point in said course from its destination.

The latitude and longitude readings also continuously change with the progress of the ship toward its point of destination. An accurate latitude and longitude reading may be had at any given moment and at any given point in the ship's course. The navigational device herein described and claimed automatically takes into account variations in the speed of the ship, changes in its course and all other factors which determine the geographical location of the ship at any given time.

By the same token, the directional readings automatically and continuously change with the progress of the ship toward its destination. Of course, should the ship take a great circle route and adhere to it without deviation, the directional readings would not change. However, this is an ideal situation which rarely occurs in practical navigation and even such elements as the wind, the waves and the tide may cause the ship to follow a somewhat erratic and perhaps even zig-zag course. However, the moment the ship deviates the slightest bit from its projected great circle course, the directional reading of the present device will change accordingly.

The invention is illustrated in the accompanying drawing, in which:

FIGURE 5 is a schematic diagram of a typical servo-amplifier circuit as used in the present invention.

Figure 1:
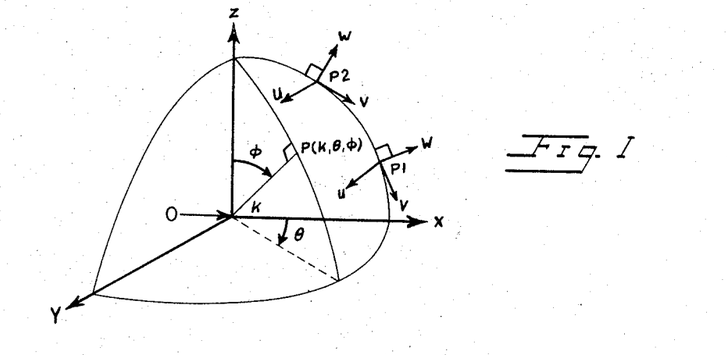
FIGURE 1 is a pictorial geometric representation of spherical coordinate axes.

With reference now to FIGURE 1, the position P of the flight vehicle can be determined with respect to three mutually orthogonal axes, X, Y, and Z which are fixed in space and chosen to have their origin at the center of the earth with the Z axis passing through the poles of the earth and with the equatorial plane of the earth in the XY plane. The flight vehicle can also be located by spherical coordinates of (K, $\theta$, $\phi$) where K is the distance of the flight vehicle from the center of the earth to the surface, plus any height of the flight vehicle above the surface of the earth, $\theta$ (theta), is the longitude of the position, and $\phi$ (phi) is the co-latitude. For the purposes of discussion, assume K to be a constant. The relationship between the coordinates in the cartesian and spherical systems are as follows:

(1) $X = K \sin \phi \cos \theta$
(2) $Y = K \sin \phi \sin \theta$
(3) $Z = K \cos \phi$ However, we are given two sets of axes in the diagram of FIGURE 1, the original set OX, OY, and OZ with origin at O and a new set Pu, Pv, and Pw tangential to the surface of the earth with the Pw axis parallel to the true local vertical and with origin at $P_1$ (l, m, n). We wish to find the relationship between the old set of coordinate axes and the new set of translated axes; they are as follows:

(4) $X = u + l$
(5) $Y = v + m$
(6) $Z = w + n$

In addition, we have rotated the new set of axes Pu, Pv, and Pw with origin at $P_1$ so that the Pw axis is parallel to the line OP (true local vertical) and perpendicular to the surface of the earth. A typical journey will begin at $P_1$ and finish at $P_2$. The relationship between the new rotated set and the old non-rotated set is as follows:

(7) $X = u \cos (xu)$ plus $v \cos (xv)$ plus $w \cos (xw)$
(8) $Y = u \cos (yu)$ plus $v \cos (yv)$ plus $w \cos (yw)$
(9) $Z = u \cos (zu)$ plus $v \cos (zv)$ plus $w \cos (zw)$ Finally, establish a corresponding triad of rotational angles, alpha, beta, and gamma around the previously rotated and translated set of axes, Pu, Pv, and Pw, respectively. Also, one must indicate what relationships exist between the vehicle's attitude and the previously stated axes of rotation; they are as follows:

(A) Any increment of angular rotation alpha is around the Pu or pitch axis of the flight vehicle from $P_1$ to $P_2$.
(B) Any increment of angular rotation beta is around the Pv or roll axis of the flight vehicle from $P_1$ to $P_2$.
(C) Any increment of angular rotation gamma is around the Pw or yaw axis of the flight vehicle from $P_1$ to $P_2$.

Figure 2:
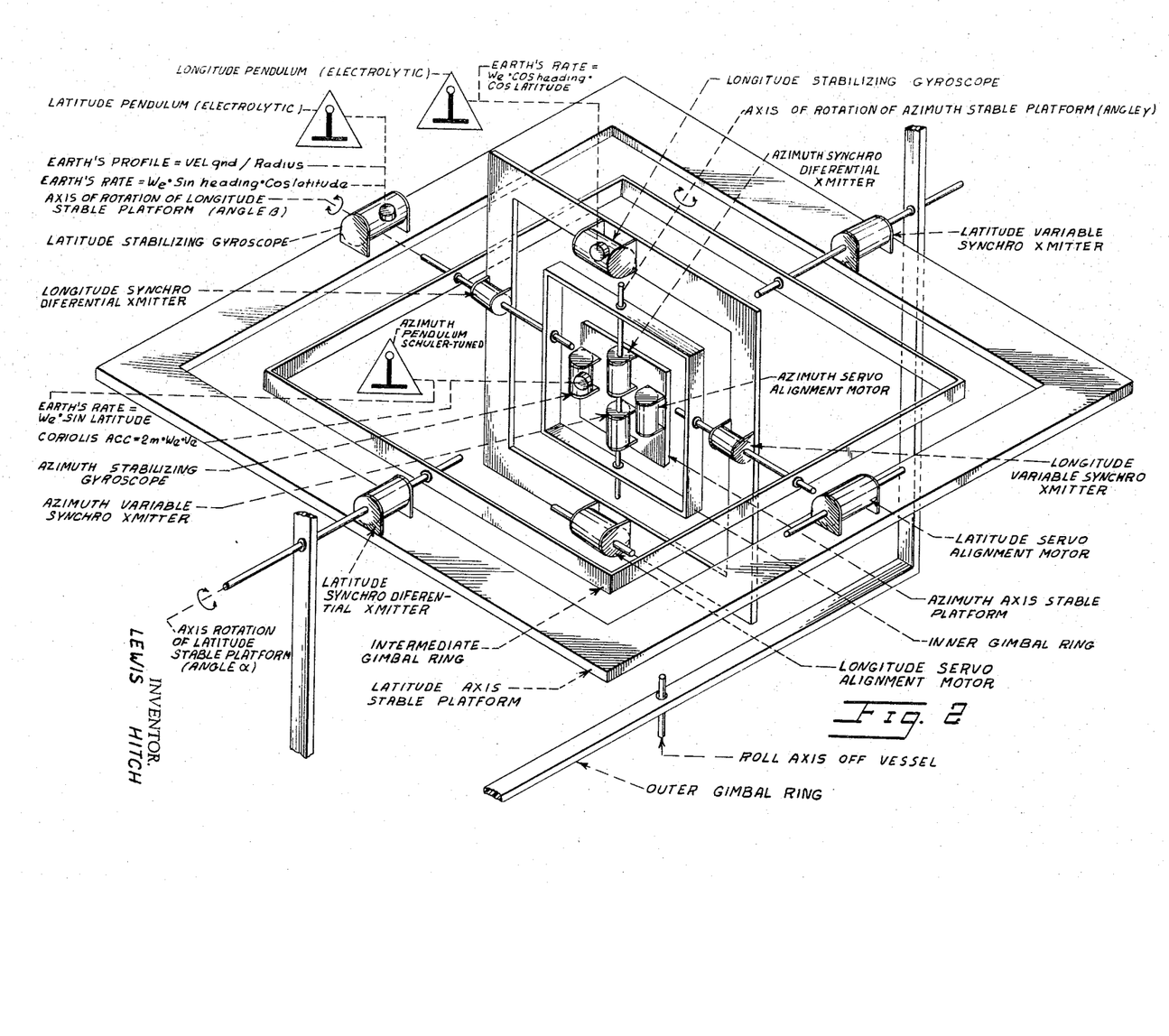
FIGURE 2 is a pictorial representation of the transmitter portion of the present invention showing and naming the elements therein.

There are three physically distinct and pivotally supported stable platforms in the present invention as shown in FIGURE 2. The first, or outermost platform performs the measurement of Latitude and is identified with part 213, the second or intermediate platform performs the measurement of Longitude and is identified with part 107, finally, the third, or inner platform performs the measurement of azimuth and is identified with part 5. However, the order of assignment for platform navigational functions is not critical so that these particular navigational functions can be interchanged among the various platforms by suitable coordinate transformation devices. The stable platforms as used in this invention utilize one gyroscope for each platform which performs the important function of having the tyro output control the respective gimbals by means of a servo loop. Manipulating arrangements of gimbals and gyros produce a great variety of platform types. For illustrative purposes, this description provides a discussion of a three gimbal three platform structure, where each platform contains one single-degree-of-freedom hermetic integrating gyroscope. This typical unit serves as a basis of comparison for alternate configurations.

Any gyroscope mounted in gimbals tries to maintain its position fixed in space. In an ideal, frictionless gimbal structure the gyro has a fixed reference. In reality, frictional torque and accelerating torques causes the gyro to precess or drift, which, in effect, disturbs its spatial reference. Today's desired drift rates of 0.001 degree/hour for inertial systems to 0.5 degree/hour for less sophisticated navigation systems can be achieved only by means of stable platforms. These are designed to use the gyro as a sensor to control a null-seeking servo loop which can provide power to generate a counter torque to its respective gimbal and maintain the gyro reference fixed in space.

Figure 3:
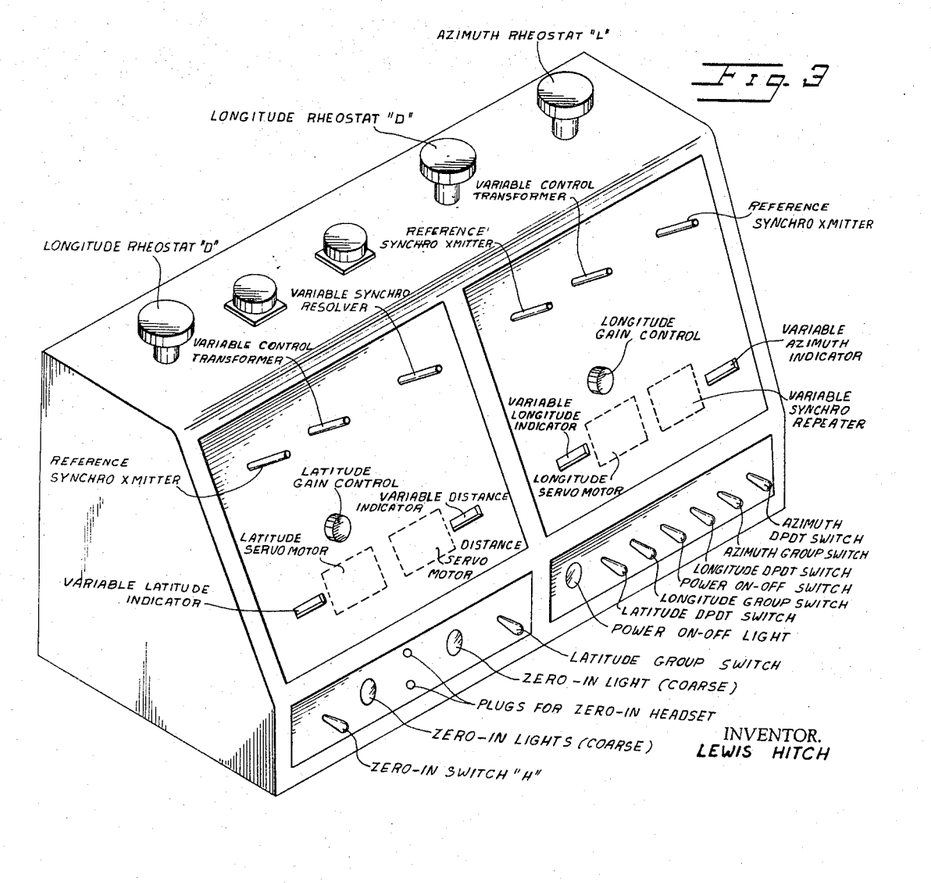
FIGURE 3 is a pictorial representation of the exterior of the receiver portion of the present invention showing and naming the components.
Figures 4, 4D:
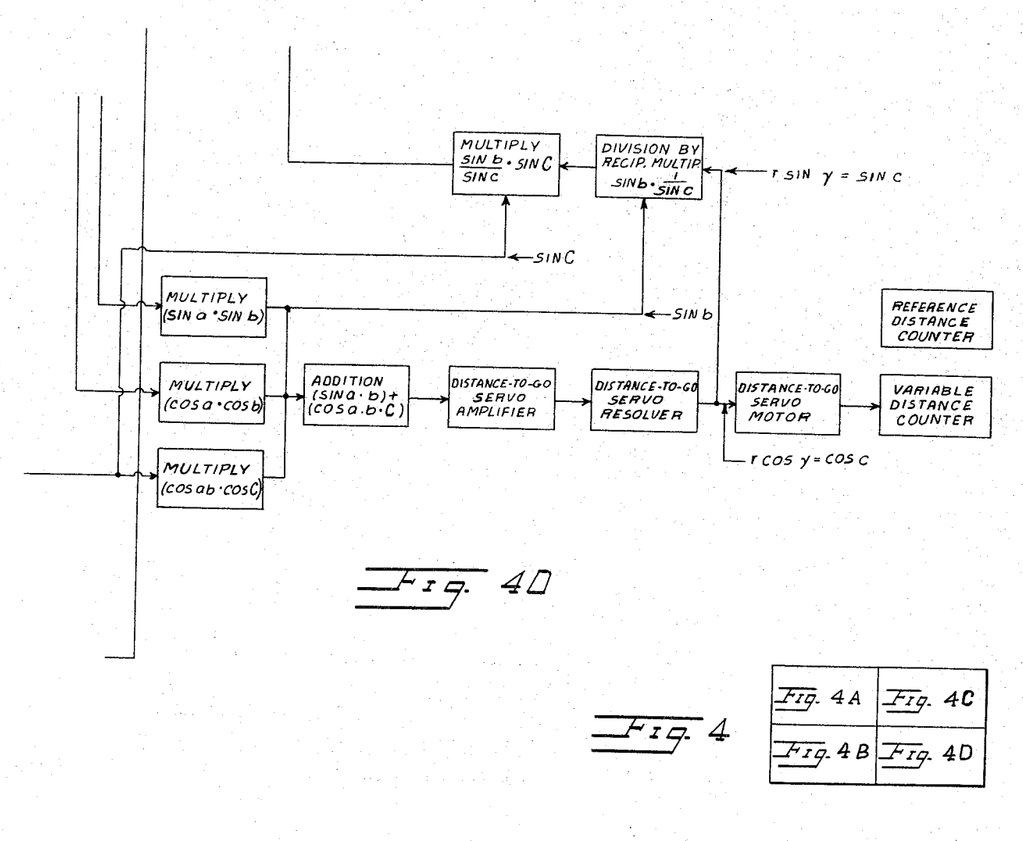
FIGURE 4 is a diagrammatic representation of the relation between FIGURES 4a, 4b, 4c and 4d.
FIGURES 4a, 4b, 4c and 4d constitute a diagrammatic representation of the present invention, the relation between said figures being shown in FIGURE 4.
Figure 4A:
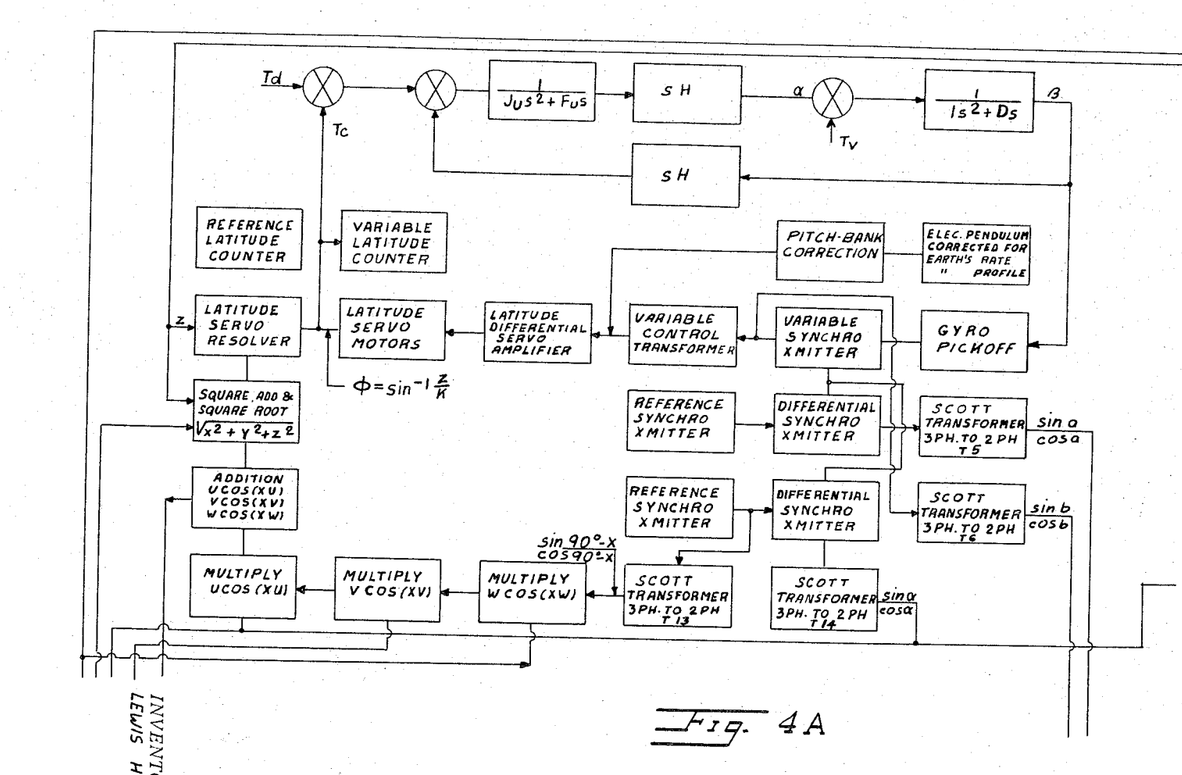
Figure 4B:
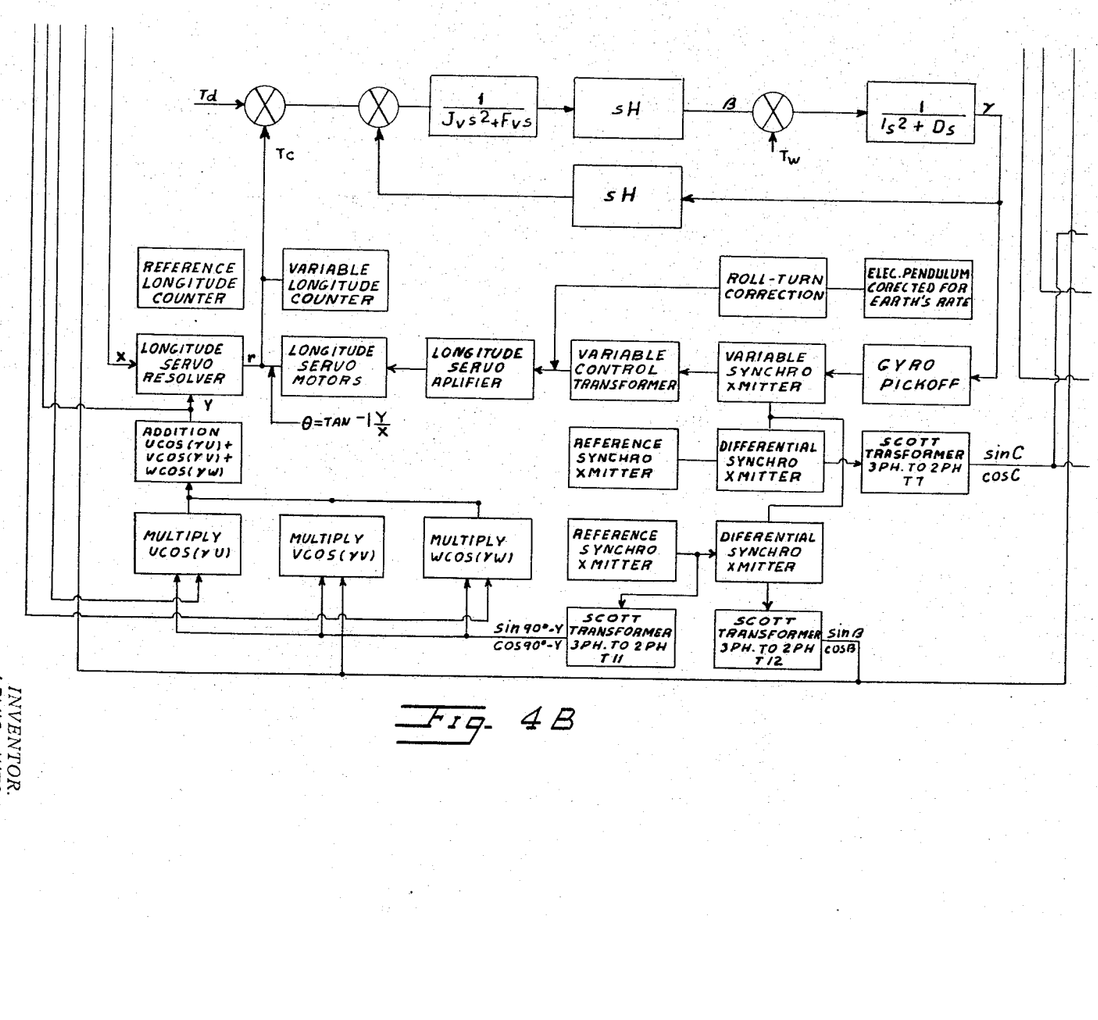
Figure 4C:
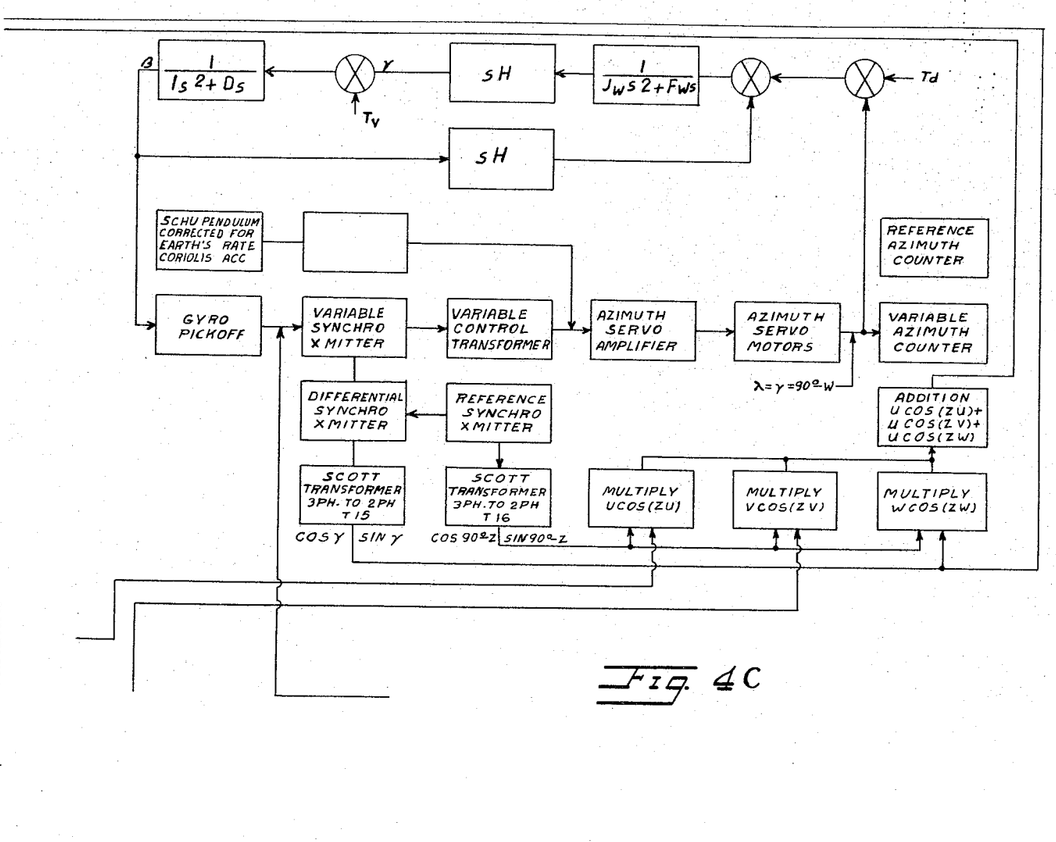
Figure 6:
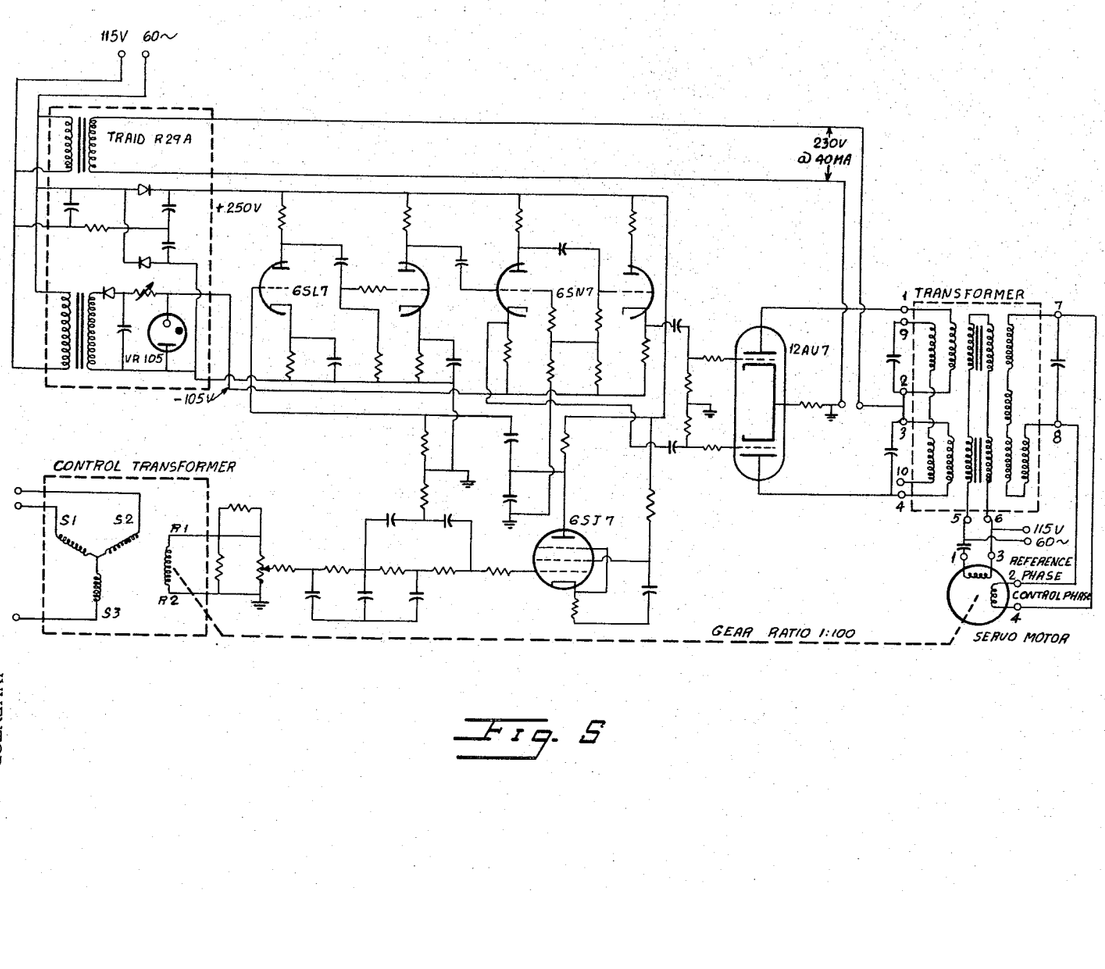

Since auxiliary power is now available to drive the gimbals, a structure composed of a number of gyros can be built. Specifically, by way of example, this invention shows a three stable platform structure where each platform contains one single-degree-of-freedom hermetic integrating gyroscope with the input axes of the gyros forming a mutually orthogonal triad. Associated with each gyro is a Latitude, Longitude, or Azimuth gimbal servo system which maintains its respective Latitude 262, Longitude 148, or Azimuth 31 gyroscope fixed in space as shown in the diagrams of FIGURES 2, 3, and 4. Specifically, the prime mover for each stable platform of the latitude, longitude or azimuth axes are the servo-alignment motors 231, 125, and 19A, respectively, as shown in FIGURE 2.

The three gyro triad 262, 148, and 31 is then positioned so that the input or sensitive axis of each individual gyroscope corresponds to either the pitch (Pu), roll (Pv) or yaw (Pw) axes of the flight vehicle as shown in the diagrams of FIGURES 1, and 2. The frame on which each gyroscope is mounted is pivotally supported in a cluster of gimbal rings. The frame, which is free to rotate around a yaw or azimuth axis is identified as the inner gimbal as shown in FIGURE 2. Its motion is controlled by the null-seeking servo-alignment motor 19A, by a gear train (not shown) which is driven by signals from its corresponding servo-amplifier using the azimuth gyro 31, as the basis for the transmitting element. The inner gimbal is pivotally supported and mounted within a gimbal known as the intermediate gimbal 100 as shown in FIGURE 2. This frame, which is free to rotate around the roll axis, is controlled by the null-seeking servo-alignment motor 125, by a gear train (not shown) which is driven by signals from its corresponding servo-amplifier using the longitude gyro 148, as a basis for the transmitting element. Fastened to the flight vehicle frame, either singly or doubly pivoted is the outer gimbal ring 200, as shown in the diagram of FIGURE 2. At the start of the journey which is point $P_1$, this outer gimbal ring is initially rotated around the yaw axis of the flight vehicle so as to eliminate north steaming or heading errors in the invention. Therefore, the pivoting axis for the Latitude measuring stable platform will be aligned with the pitch (Pu) axis of the flight vehicle in its journey from $P_1$ to $P_2$. Since the latitude axis stable platform is pivotally supported between the outer gimbal 200, and the intermediate gimbal 100, the relative motion of this stable platform is actuated by the gear train (not shown) of the null-seeking servo-alignment motor 231, which is driven by signals from its respective servo amplifier using the latitude gyro 262, as a basis for the transmitting element.

Over two thousand years ago, Archimedes discovered that a body immersed in a fluid is resisted by a buoyant force equal to the weight of the displaced fluid. This principle, utilized by floated gyroscopes 262, 148 and 31, is implemented by enclosing a gyro rotor in a can, which in turn is immersed, or "floated" in another container filled with a fluid of such density that the resultant weight of the rotor and the can is effectively reduced to zero. Under such an ideal theoretical condition, the gyro rotor exerts no load on precession axis supports. Consequently, frictional torque—the product of normal load, coefficient of friction, and the moment arm of the support—is theoretically zero too, since the normal load itself is zero. In actual practice, however, it is never possible to reduce the load to an absolute zero, so some frictional torque, though slight, is always present. By utilizing the damping restraint of the flotation fluid, an integrating floated gyroscope is obtained and is used for the sensing elements for the latitude, longitude or azimuth stable platforms in this invention.

A rate integrating gyroscope is constrained to one degree of freedom, and its displacement about the axis is proportional to the integral of the angular rate input. This type of gyro is an application of the precession principle.

Rate and rate integrating gyros are similar in their theory of operation. The difference between the two lies in the nature of their respective precession axis restraints. In rate gyros, damping restraint is kept as low as practicable, whereas in rate integrating gyros, spring restraint is as small as possible.

As a general example, the differential equation of motion common to both is (10) $$\frac{J d^2\theta}{dt^2} + \beta \frac{d\theta}{dt} + k\theta = H\omega$$

where $\theta$ is precession axis motion and $\omega$ (omega) is the velocity rate input.

For a rate integrating gyro, the spring restraint term K is set equal to zero, hence Equation 10 becomes:

(11) $$\frac{J d^2\theta}{dt^2} + \beta \frac{d\theta}{dt} = H\omega$$

Using the Laplace transform, Equation 11 becomes:

(12) $$\dot{\theta}(s) = \frac{H}{(Js+\beta)} \omega(s)$$

Rearranging:

(13) $$\omega(s) H = (Js+\beta)\dot{\theta}(s)$$

Apply an input rate of $\omega/s$ for $\omega(s)$ and observe the response $\theta(s)$. The step input represents a constant velocity W. Also rearrange the form of Equation 13 thus:

(14) $$\dot{\theta}(s) = \frac{\frac{H}{\beta}\omega}{s\left(\frac{sJ}{\beta}+1\right)}$$

The inverse transform of Equation 14 yields the expression:

(15) $$\dot{\theta} = \frac{H}{\beta}\omega\left(1 - e^{-\frac{t\beta}{J}}\right)$$

However, as time ($t$) approaches infinity, Equation 15 becomes:

(16) $$\dot{\theta} = \frac{H}{\beta}\omega$$

By integrating, Equation 17 becomes (17a) $$\theta = \frac{H}{\beta}\int \omega d^5$$

or (17b) $$\theta = \frac{H}{\beta}\phi$$

Two points are of interest. Since the $\int \omega dt$ represents a total angle, the precession angle output $\theta$ is proportional to the total input angle $\phi$. The parameter determining the behavior of an integrating gyro is the time constant $J/B$. This time constant is called the characteristic time of the gyro. As was the case for the rate gyro, a large value of $B/J$ is desirable for good transient response.

Rate integrating gyros are very often built in a design version known as a floated rate integrating gyro, which is used where exceptional high-level performance is required. Should the rotor mass of a gyro wheel having an angular momentum of $1.0 \times 10^6$ gm. cm./sec.², shift by as little as one micro-inch, a drift of 0.1 degree/hour could result. The difficulty in achieving ultra-high precision and accuracy in this respect is therefore apparent, but the necessity for obtaining low drift gyros is of paramount importance.

The floated rate integrating gyro's accuracy is responsible for its widespread use in my invention as a stable platform sensor. In earth-referenced systems and similar applications, corrective signals must be fed to the precession axis torquer of such a gyro. Recalling that $T = w \times H$, it is essential that gyro rotor angular momentum remain constant, for should the same torque be applied to a rotor having varying motor speed, gyro response will also differ, thus compromising computational accuracy. For this reason, precise floated rate integrating gyros employ synchronous hysteresis motors to spin the gyro wheel at a constant rate. Such a motor has three elements consisting of:

(a) A wound pole stator that is integral with the gyro float, (b) the gyro wheel itself which serves as the hysteresis motor rotor, and (c) a magnetic hysteresis ring attached to the gyro wheel.

Motor speed is expressed as:

(18) $$N = \frac{2\phi}{P} f(60)$$

where
$\phi$ = number of phases
$p$ = total number of poles
$f$ = excitation frequency in c.p.s.
$N$ = revolutions in cycles/minute For simplicity of discussion, each single axis platform of the three platform structure is analyzed here. It has been previously stated that each stabilizing gyroscope controls a corresponding gimbal; hence a three platform structure is, in effect, three single axis platforms with coupling inputs. These coupling inputs, however, are not considered in the single axis analysis, but will be done later in matrix form.

The latitude axis stable platform utilizing rate integrating gyros is illustrated in the upper left portion of diagram FIGURE 4. While it is theoretically possible to build platforms using rate gyros, rate integrating gyros or free gyros, the latter two are the types most frequently used. Rate gyros are too insensitive to low level angular rate of change. Therefore, this discussion here considers only platforms which use rate integrating gyroscopes with corresponding Laplace operator notation. The latitude axis stable platform is electrically and mechanically connected as shown, in the upper left portion of diagram FIGURE 4 and consists of units:

(a) Stabilizing gyroscope 262 with input along pitch axis
(b) Variable synchro transmitter 221
(c) Scott-connected transformer T6 with outputs of sin and cos $b$
(d) Variable control transformer 223
(e) Electrolytic pendulum corrected for earth's rate and profile
(f) Pitch and bank compensation
(g) Latitude differential servo amplifier
(h) Latitude servo motors 231 and 292 solving for $\phi$ (phi) equals arc sin $Z/K$
(i) Latitude servo resolver RS–292

(j) Variable latitude counter 294
(k) Reference latitude counter 293
(l) Reference synchro transmitter 224A
(m) Differential synchro transmitter 222A
(n) Scott-connected transformer, T5 with outputs of sin $a$-cos $a$
(o) Reference synchro transmitter 224B
(p) Scott-connected transformer, T13 with outputs of sin $90°-X$ and cos $90°-X$
(q) Differential synchro transmitter 222B
(r) Scott-connected transformer T14 with outputs of sin $\alpha$ and cos $\alpha$
(s) Multiplier for electrical inputs $u \cos (xu)$
(t) Multiplier for electrical inputs $v \cos (xv)$
(u) Multiplier for electrical inputs $w \cos (xw)$
(v) Addition for $X=(u \cos xu + v \cos xv + w \cos xw)$
(w) Squarer, adder and square root for $K=X^2+Y^2+Z^2$ The stabilizing gyroscope 262 of this single axis stable platform is subjected simultaneously to a torque about the input ($Pu$) and output ($Pv$) axes which correspond to the pitch and roll axes of the flight vehicle, respectively. The resultant motion is described by the following equations:

(19) $\quad T_u = (s^2 Ju + F_u S)\alpha + sH\beta$
(20) $\quad T_v = (Is^2 + Ds)\beta - sH\alpha$ where:

$\alpha$=angular motion of platform about input axis
$\beta$=angular motion of platform about gyro output axis
$J_u$=moment of inertia of gimbal about input axis
$I$=moment of inertia of gyro about output axis
$D$=damping coefficient of gyro about output axis
$F_u$=damping coefficient of gimbal about input axis
$H$=angular momentum of latitude gyro rotor, 262

If a torque disturbance $T_d$ is applied to the gimbal structure and the latitude gyro input axis, the gyro spin axis precesses around the output axis. This precession motion starts a chain reaction of events beginning with the generation of an output signal from the gyro pickoff 262, which in turn, is inserted as an input signal for the variable synchro transmitter 221, variable control transformer 223, latitude differential servo amplifier and ending with a torque from the servo-motors 231 and 292. Servo-motor 231 mechanically corrects for any torque disturbance and is located in that portion of the transmitter known as the latitude axis stable platform and is shown in the diagram of FIGURE 2. However, servo-motor 292 also corrects for any torque disturbance and is located in the receiver as shown in the diagram of FIGURE 3. Also, this servo-motor 292 is mechanically connected to the servo-resolver RS-292 and the variable latitude counter 294 while both servo motors are electrically connected in parallel. The servo-motor 231 produces a counter torque to the latitude axis stable platform, and the net input torque to the gimbal axis is the difference between the disturbing torque $T_d$ and the countertorque $T_c$. Therefore:

(21) $\quad T_u = T_d - T_c$

It is a fundamental feature of servomechanisms that a null or balance is sought by such systems. A condition in which the latitude axis stable platform experiences no motion about its input axis is sought. This can be attained if the disturbing torques are removed by the servo system so that any motion around the ($Pu$) or pitch axis of the flight vehicle becomes zero.

*First.*—Initially, the rotor of the reference latitude transmitter 224B is turned so that it is parallel to an equatorial (East-West) line on the surface of the earth. The output of this synchro is the electrical inputs for the scott-connected transformer T13 and the differential synchro transmitter 222B. Then, the output of transformer T13 establishes a reference axis of sin $90°-X$ and cos $90°-X$. Also, the output of the differential synchro transmitter 222B is the input for the scott-connected transformer T14. Then, the output of T14 establishes a reference axis of $90°-u$ which is identified as sin $\alpha$ and cos $\alpha$ and based on the actual latitude of the flight vehicle's pitch axis at the start of the journey.

*Second.*—The output of transformers T13 and T14 are the inputs for a triad of multiplication circuits whose final product will be as in Equation 7 which is:

$$X = u \cos (xu) + v \cos (xv) + w \cos (xw)$$

The other inputs of cos $v$ and cos $w$ are produced in the longitude and azimuth chains, respectively, and will be described later.

*Third.*—The inputs of X, Y, and Z are fed into a combination circuit whose function it is to provide a square root of $X^2 Y^2 Z^2$ with the inputs of Y and Z coming from the longitude and azimuth chains, respectively. The output of this circuit is known as K which is also the distance of the flight vehicle from the center of the earth to the surface. This function K is the input for one stator winding of the latitude servo-resolver RS-292. The voltage Z together with the resolver output, $e_1 \sin \phi$, is fed into a differential servo-amplifier that causes the servomechanism rotor to turn the resolver rotor RS-292 until the difference between the two amplifier inputs, Z and K, are zero. The shaft of the resolver rotor RS-292 is then at an angle of arc sin $Z/K$, which is the value of latitude, $\phi$ (phi). (See I Greenwood, Electronic Instruments, New York, 1948, 5:118–119.)

*Fourth.*—Quite naturally, the latitude axis stable platform is corrected for earth's rate ($W_e \times$ sin heading$\times$cos latitude), earth's profile ($V_g$ divided by earth's radius; K) and pitch-bank compensation. These corrective inputs are inserted at an appropriate location in the latitude axis servomechanism chain.

*Fifth.*—Subsequently, the shaft of the reference synchro transmitter 224A, is rotated so that it reads the value of latitude at the destination, which, in turn, is 36° N latitude. The output of this synchro is the electrical input for the differential synchro transmitter 222A, which has a mechanical input from the latitude axis stable platform. Therefore, the output from the differential synchro transmitter is fed, in turn, through the scott-connected transformer T5, the latter's outputs will be identified as sin $a$ and cos $a$. The usage of these functions will be described in the section on distance-to-to circuitry.

Finally, the latitude axis stable platform is rotated so that variable latitude counter 294 reads 40° 40' north, which is the value of latitude at the start of the journey. Then, the outputs of scott-connected transformer T6 will be indicative of a changing latitudinal value as the flight vehicle progresses from start to completion of journey, with these outputs identified as sin $b$ and cos $b$. The usage of these functions will be described in the section on distance-to-go circuitry.

The longitude axis stable platform utilizing a rate integrating gyro is electrically and mechanically connected as shown in the lower left portion of diagram FIGURE 4 and consists of units:

(a) Stabilizing gyroscope 148 with input along roll axis
(b) Variable synchro transmitter 115
(c) Variable control transformer 117
(d) Electrolytic pendulum corrected for earth's rate
(e) Roll and turn compensation
(f) Longitude servo amplifier
(g) Longitude servo motors 125 and 175 solving for $\theta$ (theta) is equal to arc tan $Y/X$
(h) Longitude servo-resolver RS-175
(i) Variable longitude counter 177
(j) Reference longitude counter 176
(k) Reference synchro transmitter 118A
(l) Differential synchro transmitter 116A
(m) Scott-connected transformer T7 with outputs of sin C–cos C
(n) Reference synchro transmitter 118B
(o) Differential synchro transmitter 116B (p) Scott-connected transformer T11 with outputs of sin 90°–Y and cos 90°–Y
(q) Scott-connected transformer T12 with outputs of sin β and cos β
(r) Multiplier for electrical inputs $u \cos(yu)$
(s) Multiplier for electrical inputs $v \cos(yv)$
(t) Multiplier for electrical inputs $w \cos(yw)$
(u) Addition for $Y = (u \cos yu + v \cos yv + w \cos yw)$ The stabilizing gyroscope 148 of this single axis stable platform is subjected simultaneously to a torque about the input (Pv) and output (Pw) axes which corresponds to the roll and yaw axes of the flight vehicle, respectively. The resultant motion is described by the following equations:

(22) $\quad T_v = (s^2 J_v + sF_v)\beta + sH\alpha$
(23) $\quad T_w = (Is^2 + Ds)\alpha - sH\beta$ where:

β = angular motion of platform about gyro input axis
γ = angular motion of platform about gyro output axis
$J_v$ = moment of inertia of gimbal about input axis
$I$ = moment of inertia of gyro about output axis
$D$ = damping coefficient of gyro about output axis
$F_v$ = damping coefficient of gimbal about input axis
$H$ = angular momentum of longitude gyro rotor 148

If a torque disturbance $T_d$ is applied to the gimbal structure and the longitude gyro input axis, the gyro spin axis precesses around the output axis. This precession motion starts a chain reaction of events beginning with the generation of an output signal from the gyro pickoff 148 which, in turn, is inserted as an input signal for the variable synchro transmitter 115, variable control transformer 117, longitude servo-amplifier, and ending with a torque from the servo-motors 125 and 175. Servo-motor 125 mechanically corrects for any torque disturbance and is located in that portion of the transmitter known as the longitude axis stable platform and shown in the diagram of FIGURE 2. However, servo-motor 175 also corrects for any torque disturbance and is located in the receiver as shown in the diagram of FIGURE 3. Also, this servo-motor 175 is mechanically connected to the servo-resolver RS–175 and the variable longitude counter 177, while both servo-motors are electrically connected in parallel. The servo-motor 125 produces a counter torque to the longitude axis stable platform, and the net input torque to the gimbal axis is the difference between the disturbing torque $T_d$, and the counter torque $T_e$. Therefore:

(24) $\quad T_v = T_d - T_e$

It is a fundamental feature of servomechanisms that a null or balance is sought by such systems. A condition in which the longitude axis stable platform experiences no motion about its input axis is sought. This can be attained if the disturbing torques are removed by the servo system so that any motion around the Pv or roll axis of the flight vehicle becomes zero.

*First.*—Initially, the rotor of the reference longitude transmitter 118B, is turned so that the shaft is parallel to a polar (north-south) line on the surface of the earth. The output of this synchro is the electrical inputs for the scott-connected transformer T11 and the differential synchro transmitter 116B. Then, the output of transformer T11 established a reference axis of sin 90°–Y and cos 90°–Y. Also, the output of the differential synchro transmitter 116B is the input for the scott-connected transformer T12. Then, the output of T12 establishes a reference axis of 90°–v which is identified as sin β and cos β and based on the actual longitude of the flight vehicle's roll axis at the start of the journey.

*Second.*—The outputs of transformers T11 and T12 are the inputs for a triad of multiplication² (see Greenwood reference, supra, at 3:53–54) and addition circuits whose final products will be as in Equation 8 which is:

$$Y = u \cos(yu) + v \cos(yv) + w \cos(yw)$$

The other input of cos $u$ was produced and described in the latitude chain, while the input of cos $w$ will be described later in the azimuth chain.

*Third.*—The input of X is produced from the latitude addition circuit and is supplied to one stator winding of the longitude servo-resolver RS–175 while the other input of Y is produced in the longitude addition circuit and supplied to the other stator winding of the same servo-resolver RS–175. The output of this resolver will be known as θ (theta) which is the longitude of the flight vehicle's position. It will be seen that one rotor winding picks up a voltage.

(25) $\quad -x \sin\theta + y \cos\theta$ and the other $x \cos\theta + y \sin\theta$. The servo-amplifier has the function of driving the θ shaft until it reaches zero. "Perhaps a simpler physical explanation of what happens is that the servo-amplifier causes one rotor to be oriented perpendicular to the magnetic field that is the resultant of the two fields produced by the stators; the other rotor winding, parallel to the field, picks up the resultant voltage." (Greenwood, supra, page 162.) The shaft of the resolver rotor RS–175, is then at a value of longitude which fulfills Equation 26 which is:

(26) $\quad \theta = \arctan Y/X$ (Greenwood, supra, 6:160–162.)

*Fourth.*—Quite naturally, the longitude axis stable platform is corrected for earth's rate ($W_e$ times cos heading times cos latitude) and roll-turn compensation. These corrective inputs are inserted at an appropriate location in the longitude axis servomechanism chain.

*Fifth.*—Subsequently, the shaft of the reference synchro transmitter 118A is rotated so that it reads the value of longitude at the destination, which, in this case is 5° 42′ west longitude. The output of this synchro is the electrical input for the differential synchro transmitter 116A, which has a mechanical input from the longitude axis stable platform. Therefore, the output from the differential synchro transmitter is fed, in turn, through the scott-connected transformer T7 whose outputs will be identified as sin C and cos C. These functions will be described in the section on distance-to-go circuitry.

Finally, the longitude axis stable platform is rotated so that the variable longitude counter 177 reads 74° West, which is the value of longitude at the start of the journey. Then, the outputs of scott-connected transformer, T7, will be indicative of the difference of a changing longitudinal value as the flight vehicle progresses from start to completion of journey, with these outputs identified as sin C and cos C. The usage of these functions will be described in the section on distance-to-go circuitry.

The azimuth axis stable platform utilizing a rate integrating gyro is electrically and mechanically connected as shown in the upper right portion of diagram FIGURE 4 and consists of units:

(a) Stabilizing gyroscope 31 with input along yaw axis
(b) Variable synchro transmitter 7
(c) Variable control transformer 9
(d) Schuler pendulum corrected for true vertical
(e) Coriolis effect and earth's rate correction
(f) Azimuth servo-amplifier
(g) Azimuth servo-motors 19A and 19B solving for lambda = α = 90°–w
(h) Variable azimuth counter 50
(i) Reference azimuth counter 49
(j) Reference synchro transmitter 10
(k) Differential synchro transmitter 8
(l) Scott-connected transformer T16 with outputs of sin 90°–Z and cos 90°–Z
(m) Scott-connected transformer T15 with outputs of sin γ and cos γ.

(n) Multiplier for electrical inputs $u \cos (zu)$
(o) Multiplier for electrical inputs $v \cos (zv)$
(p) Multiplier for electrical inputs $w \cos (zw)$
(q) Addition for $Z=(u \cos zu + v \cos zv + w \cos zw)$ The stabilizing gyroscope 31 of this single axis stable platform is subjected simultaneously to a torque about the input (Pw) and output (Pv) axes which correspond to the yaw and roll axes of the flight vehicle, respectively. The resultant motion is described by the following equations:

(27) $\quad T_w = (s^2 J_w + s F_w)\gamma + sH\alpha$ (28) $\quad T_v = (Is^2 + Ds)\alpha - sH\gamma$ where:

$\gamma$=angular motion of platform about gyro input axis
$\alpha$=angular motion of platform about gyro output axis
$J_w$=moment of inertia of gimbal about input axis
$I$=moment of inertia of gyro about output axis
$D$=damping coefficient of gyro about output axis
$F_w$=damping coefficient of gimbal about input axis
$H$=angular momentum of azimuth gyro rotor 31

If a torque distrubance $T_d$ is applied to the gimbal structure and the azimuth gyro input axis, the gyro spin axis precesses around the output axis. This precession motion starts a chain reaction of events beginning with the generation of an output signal from the gyro pickoff 31 which, in turn, is inserted as an input signal for the variable synchro transmitter 7, variable control transformer 9, azimuth servo-amplifier, and ending with a torque from the servo-motors 19A and 19B. Servo-motor 19A mechanically corrects for any torque disturbance and is located in that portion of the transmitter known as the azimuth axis stable platform and shown in the diagram of FIGURE 2. However, servo-motor 19B also corrects for any torque disturbance and is located in the receiver as shown in the diagram of FIGURE 3. Also, this servo-motor 19B is mechanically connected to the variable azimuth counter 50 while both servo-motors are electrically connected in parallel. The servo-motor 19A produces a counter torque to the azimuth axis stable platform, and the net input torque to the gimbal axis is the difference between the disturbing torque $T_d$ and the counter torque $T_c$. Therefore:

(29) $\quad T_w = T_d - T_c$

It is a fundamental feature of servomechanisms that a null or balance is sought by such systems. A condition in which the azimuth axis stable platform experiences no motion about its input axis is sought. This can be attained if the disturbing torques are removed by the servo system so that any motion around the Pw or yaw axis of the flight vehicle becomes zero.

*First.*—Initially, the rotor of the reference azimuth transmitter 10 is turned so that the shaft is parallel to a polar (north-south) line on the surface of the earth. The output of this synchro is the electrical inputs for the scott-connected transformer T16 and the differential synchro transmitter 8. Then, the output of transformer T16 establishes a reference axis of $\sin 90°-Z$ and $\cos 90°-Z$. Also, the output of the differential synchro transmitter 8 is the input for the scott-connected transformer T15. Then, the output of T15 establishes a reference axis of $90°-w$ which is identified as $\sin \gamma$ and $\cos \gamma$ and based on the actual azimuth of the flight vehicle's yaw axis at the start of the journey.

*Second.*—The outputs of transformers T15 and T16 are the inputs for a triad of multiplication and addition circuits whose final products will be as in Equation 9 which is:

$$Z = u \cos (zu) + v \cos (zv) + w \cos (zw)$$

The other inputs of $\cos u$ and $\cos v$ were produced and described in the latitude and longitude chains, respectively.

*Third.*—The azimuth axis stable platform is slaved so that the input is from the computed initial course of the distance-to-go circuits and satisfies equation:

(30) $\quad \sin b/\sin c \text{ times } \sin C$

This initial course input to the azimuth axis stable platform is based on a great circle distance and will naturally vary in azimuth as the flight vehicle progresses along its journey from $P_1$ to $P_2$.

*Fourth.*—Quite naturally, the azimuth axis stable platform is corrected for earth's rate ($W_e$ times sin latitude) and Coriolis effect compensation. The azimuth axis stable platform is so torqued that its pivoting axis is parallel to a true vertical line (OP) that is shown on FIGURE 1 and furnished by signals from the Schuler pendulum.

*Fifth.*—Subsequently, the output of the differential synchro transmitter 8 is fed, in turn, to the scott-connected transofrmer T15. The output of transformer T15 is $\cos \gamma$ and $\sin \gamma$ which is based on $90°-w$, and varies as the flight vehicle progresses along its journey from $P_1$ to $P_2$. Obviously, the azimuth axis stable platform will vary as the ship or flight vehicle is affected by winds or tides, etc., etc., as it processes along its journey from $P_1$ to $P_2$.

The gimbal servo loop, whether it be Latitude, Longitude or Azimuth, is usually referred to as the alignment loop. Like all loops, they are subject to the same criteria of stability and response over a wide range of operating frequencies. A typical analysis is concerned with the transfer function between the disturbing torque $T_d$ and the input angle alpha, or between $T_d$ and the gyro precession angle beta, as would be the case in the latitude servomechanism chain. The basic block diagram as shown in FIGURE 4 does not include certain compensation networks for the latitude, longitude and azimuth servomechanisms. In actual practice, compensation networks are required to assure that:

(D) Adequate gain margin is allowed for unusual gain changes.
(E) Adequate phase margin is provided to minimize torque resonance between $T_c$ and $T_d$.
(F) The phase lead and gain characteristics limit the countertorque $T_c$ above the system's natural frequency.

*Finally.*—The analysis of the three platform structure must consider cross-coupling effects between the loops and the additional degrees of freedom represented. The three stable platforms are gimbal mounted and have one, two, or three degrees of freedom, depending on whether it is a latitude, longitude or azimuth stable platform, respectively. A torque disturbance about one axis can cause a response about all three axes. An initial analysis which considers only the gyro pickoff response usually suffices by setting up three linear equations with three unknowns in the form of:

$$A_1 u + B_1 v + C_1 w = D_1$$
$$A_2 u + B_2 v + C_2 w = D_2$$
$$A_3 u + B_3 v + C_3 w = D_3$$

Then, let the respective stable platform system which has three unknowns, and shown in the block diagram of FIGURE 4, correspond to the elements of a determinant where:

$a_1 = T_u$ (latitude gyro input axis)
$b_1 = T_v$ (latitude gyro output axis)
$c_1 = T_c$ (corrective torque from latitude servo-motor 231)
$a_2 = T_v$ (longitude gyro input axis)
$b_2 = T_w$ (longitude gyro output axis)
$c_2 = T_c$ (corrective torque from longitude servo-motor 125)
$a_3 = T_w$ (azimuth gyro input axis)
$b_3 = T_v$ (azimuth gyro output axis)
$c_3 = T_c$ (corrective torque from azimuth servo-motor 19A).

Then, we create a corresponding matrix from the previous linear equations with three unknowns which will fulfill any of three given solutions:

$$(31) \quad U = \frac{\begin{vmatrix} d_1 & b_1 & c_1 \\ d_2 & b_2 & c_2 \\ d_3 & b_3 & c_3 \end{vmatrix} \begin{vmatrix} d_1 & b_1 \\ d_2 & b_2 \\ d_3 & b_3 \end{vmatrix}}{\begin{vmatrix} a_1 & b_1 & c_1 \\ a_2 & b_2 & c_2 \\ a_3 & b_3 & c_3 \end{vmatrix} \begin{vmatrix} a_1 & b_1 \\ a_2 & b_2 \\ a_3 & b_3 \end{vmatrix}}$$

$$U = \frac{d_1b_2c_3 + d_2b_3c_1 + d_3b_1c_2 - d_3b_2c_1 - d_2b_1c_3 - d_1b_3c_2}{a_1b_2c_3 + a_2b_3c_1 + a_3b_1c_2 - a_3b_2c_1 - a_2b_1c_3 - a_1b_3c_2}$$

$$(32) \quad V = \frac{\begin{vmatrix} a_1 & d_1 & c_1 \\ a_2 & d_2 & c_2 \\ a_3 & d_3 & c_3 \end{vmatrix} \begin{vmatrix} a_1 & d_1 \\ a_2 & d_2 \\ a_3 & d_3 \end{vmatrix}}{\text{delta}}$$

$$V = \frac{a_1d_2c_3 + a_2d_3c_1 + a_3d_1c_2 - a_3d_2c_1 - a_2d_1c_3 - a_1d_3c_2}{a_1b_2c_3 + a_2b_3c_1 + a_3b_1c_2 - a_3b_2c_1 - a_2b_1c_3 - a_1b_3c_2}$$

$$(33) \quad W = \frac{\begin{vmatrix} a_1 & b_1 & d_1 \\ a_2 & b_2 & d_2 \\ a_3 & b_3 & d_3 \end{vmatrix} \begin{vmatrix} a_1 & b_1 \\ a_2 & b_2 \\ a_3 & b_3 \end{vmatrix}}{\text{delta}}$$

$$W = \frac{a_1b_2d_3 + a_2b_3d_1 + a_3b_1d_2 - a_3b_2d_1 - a_2b_1d_3 - a_1b_3d_2}{a_1b_2c_3 + a_2b_3d_1 + a_3b_1c_2 - a_3b_2c_1 - a_2b_1c_3 - a_1b_3c_2}$$

The denominator is the same for each given solution.

The primary inputs for the distance-to-go computer are supplied by the outputs of scott-connected transformers T5, T6, and T7, of the latitude and longitude servomechanism chains. This distance-to-go computer is electrically and mechanically connected as shown in the lower right portion of diagram FIGURE 4 and consists of units:

(a) Multiplier for electrical inputs sin $a$ and sin $b$
(b) Multiplier for electrical inputs cos $a$ and cos $b$
(c) Multiplier for electrical inputs cos $ab$ and cos $C$
(d) Addition for sin $ab +$ cos $abC$
(e) Distance-to-go servo amplifier
(f) Distance-to-go servo resolver 300
(g) Distance-to-go servo motor 304 solving for $r$ sin $c$ and $r$ cos $c$
(h) Variable distance counter 301
(i) Reference distance counter 302
(j) Division for electrical inputs sin $b$ times 1/sin $c$
(k) Multiplier for electrical inputs sin $b$/sin $c$ times sin $C$ The five variables of the distance-to-go computer are simply the Cosine law for sides of a spherical triangle. The law states that: "The cosine of a side of a spherical triangle is equal to the product of the cosine of the other two sides plus the products of the sines of those two sides multiplied by the cosine of the included angle." (See Nielson, Plane and Spherical Trigonometry, New York, 1959, page 89.) Then cosine $c$ (distance) equals cos $a \times$ cos $b +$ sin $a \times$ sin $b \times$ cos $C$ However, to understand Napier rules, note first that in the right spherical triangle ACB and having sides $b$, $c$ and $a$, there is a right angle C and side $c$ is the hypotenuse. Therefore, we replace the sides by their co-functions, except the right angle $C$. This means that the practical distance-to-go solution is fulfilled by:

(34) cos $c$ (distance) $=$ sin $a \times$ sin $b +$ cos $a \times$ cos $b \times$ cos $C$

*First.*—As was said previously, the outputs of sin $a$ and cos $a$ from transformer T5, correspond to the electrical equivalent of latitude angle of the reference synchro transmitter 224A, at the destination which is 36° North latitude.

Also, the outputs of sin $b$ and cos $b$ from transformer T6, correspond to the electrical equivalent of latitude angle of the latitude axis stable platform as the flight vehicle progresses from start (40° 40′ North latitude) to completion (36° North latitude) of the journey.

Thus, the outputs of sin C and cos C correspond to the electrical equivalent of longitudinal difference between the start (74° West longitude) and completion (5° 42′ West longitude) of the journey, as indicated by the longitude differential synchro transmitter 116A.

*Second.*—The outputs of transformers T5, T6, and T7 are the inputs for a triad of multiplication and addition circuits whose final product and sum will be as in Equation 34 which is:

(34) cos $c =$ sin $a \times$ sin $b +$ cos $a \times$ cos $b \times$ cos $C$

The output signals from the addition network are supplied to the distant-to-go servo amplifier, which, in turn, is the input to the distance-to-go servo-resolver 300.

One stator winding of this servo-resolver 300 is proportional to the electrical equivalent of sin $c$ and the other stator winding is proportional to the electrical equivalent of cos $c$ which is the solution to Equation 34.

*Third.*—Then, the output signal from the resolver winding producing cos $c$ is supplied to the servo-motor-servo-resolver combination. The distance-to-go servo-motor 304 is mechanically connected to both the variable distance counter 301 as well as the distance-to-go servo-resolver 300. This servo-motor will operate on a signal, either in a clockwise or counter-clockwise direction, until there is a null or zero point in the output rotor terminal of the distance-to-go servo-resolver 300. Based on the example of latitude and longitude given for location A (P₁) and B (P₂), the value of Equation 34 at the start of the journey will be the cosine of 52° 32′ which is equivalent to 3152 nautical miles.

*Fourth.*—The output signal from the resolver winding producing sin $c$ will be one factor to determine the value of the azimuth axis stable platform at the start of the journey. This output of sin $c$ from the distance-to-go servo-resolver 300 is converted to 1/sin $c$ by a combination of a fixed resistor and a potentiometer which is designed to give a non-linear output with a linear input. Then this output of 1/sin $c$ is first divided by sin $b$ through reciprocal multiplication, and then again multiplied by sin C to provide the value of azimuth for the azimuth axis stable platform.

This circuit insures that the rotor angle of the azimuth axis stable platform will be always known beforehand, and thus will fulfill Equation 35 where:

(35) $\gamma =$ sin $b/$sin $c \times$ sin $C$

*Fifth.*—Based on the example of latitude and longitude given for location A (P₁) and B (P₂), the value of Equation 35 at the start of the journey will be the sin whose angle is 50° 42′, due East of North in a clockwise direction.

*Finally.*—The reference counters, either latitude 293, longitude 176, or distance 302, are arranged to read their particular values at the destination—or the beginning for the azimuth counter 49.

I claim:

1. Navigational apparatus of the character described, comprising a gyroscopic latitude computer, a gyroscopic longitude computer and a gyroscopic azimuth computer, all three computers being synchronized to provide continuous information as to the latitude and longitude of any developed position on a course from a given starting point to a given point of destination, together with the distance from said developed position to said point of destination, said gyroscopic latitude computer including a latitude outer gimbal ring and a gyroscopically controlled latitude stable platform pivotally mounted on said latitude outer gimbal ring, said gyroscopic longitude computer including a longitude intermediate gimbal ring pivotally mounted on said latitude stable platform and a gyroscopically controlled longitude stable platform mounted on said longitude intermediate gimbal ring, and said gyroscopic azimuth computer including an azimuth inner gimbal ring pivotally mounted on said longitude stable platform, and a gyroscopically controlled azimuth stable platform pivotally mounted on said azimuth inner gimbal ring.

2. Navigational apparatus in accordance with claim 1, wherein said three computers additionally provide continuous information as to the direction by great circle route from any such developed position to said point of destination.

3. Navigational apparatus in accordance with claim 1, wherein said apparatus has means for setting the apparatus with the latitude and longitude of said given starting point and the latitude and longitude of said given point of destination.

4. Navigational apparatus in accordance with claim 2, wherein said apparatus has means for setting the apparatus with the latitude and longitude of said given starting point and the latitude and longitude of said given point of destination.

5. Navigational apparatus in accordance with claim 1, wherein the latitude outer gimbal ring is adapted to be fixed to a vehicle which is to be guided by said navigational apparatus in tangential relation to the surface of the earth.

6. Navigational apparatus in accordance with claim 1, wherein the latitude outer gimbal ring is adapted to be fixed to a vehicle which is to be guided by said navigational apparatus in tangential relation to the surface of the earth, the pivotal axis between the latitude stable platform and the latitude outer gimbal ring being the latitude axis disposed in parallel relation to the geographic equator.

7. Navigational apparatus in accordance with claim 1, wherein the latitude outer gimbal ring is adapted to be fixed to a vehicle which is to be guided by said navigational apparatus in tangential relation to the surface of the earth, the pivotal axis between the latitude stable platform and the latitude outer gimbal ring being the latitude axis disposed in parallel relation to the geographic equator, the pivotal axis between the longitude intermediate gimbal ring and the longitude stable platform being the longitude axis disposed in parallel relation to the geographic North-South polar axis.

8. Navigational apparatus in accordance with claim 1, wherein the latitude outer gimbal ring is adapted to be fixed to a vehicle which is to be guided by said navigational apparatus in tangential relation to the surface of the earth, the pivotal axis between the latitude stable platform and the latitude outer gimbal ring being the latitude axis disposed in parallel relation to the geographic equator, the pivotal axis between the longitude intermediate gimbal ring and the longitude stable platform being the longitude axis disposed in parallel relation to the geographic North-South polar axis, the pivotal axis between the longitude stable platform and the azimuth inner gimbal ring coinciding with said longitude axis between the longitude stable platform and the longitude intermediate gimbal ring, said azimuth inner gimbal ring being disposed about an azimuth axis extending radially of the geographic center of the earth and perpendicular to the earth's surface.

9. Navigational apparatus in accordance with claim 8, wherein a latitude variable synchro-transmitter and a latitude synchro-differential transmitter are disposed on the latitude axis between the latitude outer gimbal ring and the latitude stable platform, said synchro-transmitter being adapted to sense and signal changes in angular relationship between said latitude stable platform and said latitude outer gimbal ring.

10. Navigational apparatus in accordance with claim 8, wherein a longitude variable synchro-transmitter and a longitude synchro differential transmitter are disposed on the longitude axis between the longitude intermediate gimbal ring and the longitude stable platform, said synchro-transmitters being adapted to sense and signal changes in angular relationship between said longitudinal stable platform and said longitude intermediate gimbal ring.

11. Navigational apparatus in accordance with claim 8, wherein an azimuth variable synchro-transmitter and an azimuth synchro-differential transmitter are disposed on the azimuth axis of the azimuth inner gimbal ring, said synchro-transmitters being adapted to sense and signal angular variations of the entire navigational apparatus about the azimuth axis.

References Cited

UNITED STATES PATENTS 2,946,539   7/1960   Fischel _______________ 33—226
2,996,268   8/1961   Brown et al. ____ 235—150.25 X MALCOLM A. MORRISON, *Primary Examiner.*

K. W. DOBYNS, M. P. HARTMAN,
*Assistant Examiners.*